United States Patent
Han et al.

(10) Patent No.: US 7,606,416 B2
(45) Date of Patent: Oct. 20, 2009

(54) LANDMARK DETECTION APPARATUS AND METHOD FOR INTELLIGENT SYSTEM

(75) Inventors: Woo-Sup Han, Yongin-si (KR); Kyung-shik Roh, Seongnam-si (KR); Woong Kwon, Seongnam-si (KR); Young-bo Shim, Seoul (KR); Yeon-taek Oh, Yongin-si (KR); Ki-cheol Park, Taean-sub (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 815 days.

(21) Appl. No.: 10/989,401

(22) Filed: Nov. 17, 2004

(65) Prior Publication Data
US 2005/0107947 A1    May 19, 2005

(30) Foreign Application Priority Data
Nov. 17, 2003    (KR) .................... 10-2003-0081232

(51) Int. Cl.
*G06K 9/34*    (2006.01)
(52) U.S. Cl. .................. 382/171; 382/162; 701/207
(58) Field of Classification Search .............. 382/162, 382/171; 701/207
See application file for complete search history.

(56) References Cited

U.S. PATENT DOCUMENTS
5,612,793 A * 3/1997 Ito et al. ................ 358/500

FOREIGN PATENT DOCUMENTS
JP    06-070333 A    3/1994
JP    2004-044352 A    2/2005

OTHER PUBLICATIONS

Kuk-Jin Yoon & In-So Kweon; "Artificial Landmark Tracking Based on the Color Histogram"; IEEE/RSJ Oct. 29-Nov. 3, 2001; pp. 1918-1923.*

Michael Isard & Andrew Blake; "Condensation-Conditional Density Propagation for Visual Tracking"; International Journal of Computer Vision; 29(I), 5-28 (1998).*

* cited by examiner

*Primary Examiner*—Vikkram Bali
*Assistant Examiner*—Eueng-Nan Yeh
(74) *Attorney, Agent, or Firm*—Sughrue Mion, PLLC

(57) ABSTRACT

A landmark detection apparatus and method, the apparatus including a first detection unit that generates N first sample blocks in a first sampling region using a first weighted sampling method according to a first degree of dispersion, and that performs a first landmark detection by comparing a feature of each first sample block a feature of a landmark model, where the first sample region is set to the entirety of a current frame image; and a second detection unit that generates N second sample blocks in a second sampling region using a second weighted sampling method according to a second degree of dispersion, and that performs a second landmark detection by comparing a feature of each second sample block the feature of the landmark model, where the second sampling region is set to an area less than the entirety of the current frame image.

21 Claims, 10 Drawing Sheets

LANDMARK DETECTION APPARATUS AND METHOD FOR INTELLIGENT SYSTEM

This application is based upon and claims the benefit of priority from Korean Patent Application No. 2003-81232, filed on Nov. 17, 2003, in the Korean Intellectual Property Office, the disclosure of which is incorporated herein in its entirety by reference.

BACKGROUND OF THE INVENTION

1. Field of the Invention

The invention relates to a landmark detection apparatus and method for estimating a current position of an intelligent system during autonomous traveling.

2. Description of the Related Art

In recent years, interest in intelligent systems such as intelligent vehicle systems (for example, unmanned planes, unmanned vehicles, and mobile robots), unmanned surveillance systems, and intelligent transportation systems has grown. Accordingly, studies on such intelligent systems are being actively conducted. In particular, diverse localization methods are being suggested to help intelligent systems recognize their positions. In addition, localization methods using artificial or natural landmarks and based on optical technology are being presented.

Localization using a natural landmark is a more common method than localization using an artificial landmark and is suitable for both indoor and outdoor use. A natural landmark is selected within a scene with consideration of its geometrical or optical characteristics, and an intelligent system recognizes the natural landmark by its characteristics or feature amounts. However, localization using a natural landmark has a disadvantage in that it is difficult to extract an optimal landmark in an actual environment.

On the other hand, localization using an artificial landmark is a very simple and effective method for an intelligent system to estimate its position indoors. An intelligent system performs modeling of a landmark model, or feature amounts in a landmark model, in advance and, while traveling, locates an artificial landmark in an image. Therefore, in localization using an artificial landmark, it is important to select proper forms or feature amounts of a landmark and a proper landmark detection method.

Many landmark models have been suggested together with detection algorithms. Examples include a landmark model having certain forms, such as a bar code, or a black and white self-similar pattern. Since a localization method using information regarding certain forms of a landmark is heavily dependent on results of image processing, a landmark localization success rate is low due to a blurring phenomenon caused by noise or inaccurate focus in an image.

Meanwhile, a CONDENSATION (CONditional DENsity propagATION) algorithm is used for landmark detection. The CONDENSATION algorithm is known to be able to track an object in real time in a complicated environment. In the CONDENSATION algorithm, an entire region of each frame image is set as a sampling region, and an initial set value of a degree of dispersion is applied to each frame image. Therefore, in the CONDENSATION algorithm, landmark detection requires a lot of time, and, if the initial value of the degree of dispersion is set to a high value, detection accuracy is undermined. The CONDENSATION algorithm is disclosed in the paper "CONDENSATION-Conditional Density Propagation for Visual Tracking," Int. J. Computer Vision, 1998, by M. Isard and A. Blake.

SUMMARY OF THE INVENTION

The invention provides a landmark detection apparatus and method having strong resistance to noise and improved detection accuracy by setting an entire region of a frame image as a sampling region, setting a degree of dispersion to a high value, performing first landmark detection, estimating a position of a landmark, setting a region around the estimated position of the landmark as a sampling region, setting the degree of dispersion to a low value, and performing second landmark detection.

The invention also provides a landmark detection apparatus and method capable of improving accuracy of landmark detection by adaptively adjusting a degree of dispersion applied to each frame in first and second landmark detections using a highest matching probability obtained from a current frame image.

The invention also provides a landmark detection apparatus and method with stronger resistance to luminance changes by updating a color histogram of a landmark model using a matching probability obtained from a current frame image, color histograms of sample blocks used in the current frame image, and a color histogram of the landmark model used in the current frame image.

According to an aspect of the invention, there is provided a landmark detection apparatus for an intelligent system. The apparatus includes a first detection unit that generates a group of N first sample blocks in a first sampling region using a first weighted sampling method according to a first degree of dispersion, and that performs a first landmark detection by comparing a feature of each first sample block of the group of N first sample blocks to a feature of a landmark model, where the first sampling region is set to the entirety of a current frame image; and a second detection unit that generates a group of N second sample blocks in a second sampling region using a second weighted sampling method according to a second degree of dispersion, and that performs a second landmark detection by comparing a feature of each second sample block of the group of N second sample blocks to the feature of the landmark model, where the second sampling region is set to an area less than the entirety of the current frame image.

According to another aspect of the invention, there is provided a landmark detection method for an intelligent system. The method includes generating a group of N first sample blocks in a first sampling region using a first weighted sampling method according to a first degree of dispersion, and performing a first landmark detection by comparing a feature of each sample block of the group of N first sample blocks to a feature of a landmark model, where the first sampling region is set to the entirety of a current frame image; and generating a group of N second sample blocks in a second sampling region using a second weighted sampling method according to a second degree of dispersion, and performing a second landmark detection by comparing a feature of each second sample block of the group of second sample blocks to the feature of the landmark model, where the second sampling region is set to an area less than the entirety of the current frame image.

The method may be implemented in a computer-readable recording medium which stores a program for performing the methods on a computer.

BRIEF DESCRIPTION OF THE DRAWINGS

The above and other objects, features and advantages of the invention will become more apparent by describing in detail exemplary embodiments thereof with reference to the attached drawings in which.

DETAILED DESCRIPTION OF THE INVENTION

The invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
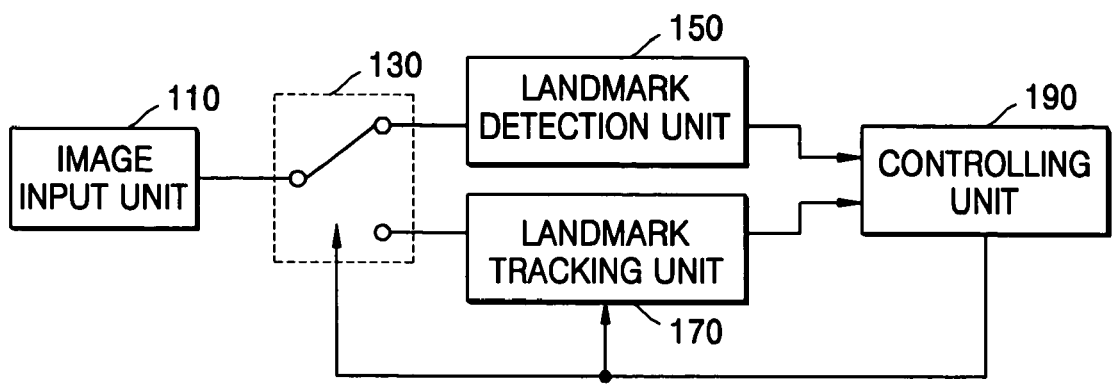
FIG. 1 is a block diagram of a landmark detection apparatus of an intelligent system according to an exemplary embodiment of the invention.
Figure 2:
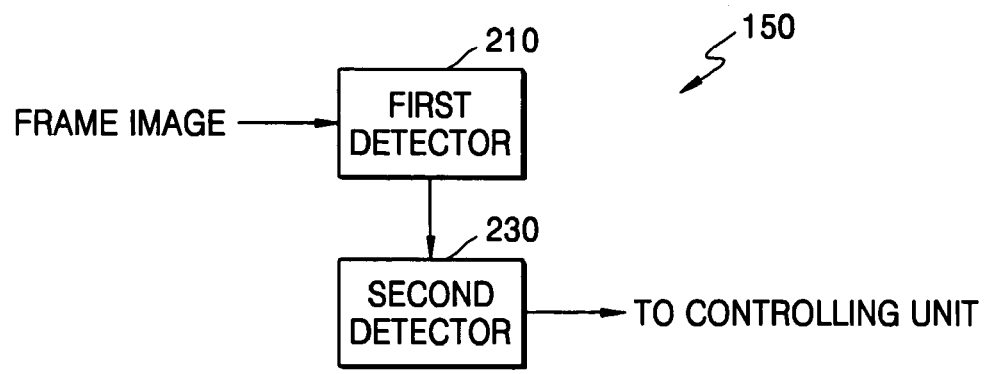
FIG. 2 is a block diagram of a landmark detection unit illustrated in FIG. 1.

FIG. 1 is a block diagram of a landmark detection apparatus of an intelligent system according to an exemplary embodiment of the invention. The landmark detection apparatus includes an image input unit 110, a switching unit 130, a landmark detection unit 150, a landmark tracking unit 170, and a controlling unit 190. The landmark detection unit 150 includes a first detector 210 and a second detector 230 as illustrated in FIG. 2. Here, the switching unit 130, the landmark tracking unit 170, and the controlling unit 190 are optional.

Referring to FIGS. 1 and 2, an image picked up by a camera is input to the image input unit 110 in frames.

The switching unit 130 transmits a current frame image received from the image input unit 110 to the landmark detection unit 150 or the landmark tracking unit 170 depending on a switching control signal received from the controlling unit 190. The switching signal is based on a detection or tracking result of the landmark detection unit 150 or the landmark tracking unit 170.

When a landmark has been detected or tracked in a previous frame image, the switching unit 130 provides the current frame image to the landmark tracking unit 170. When a landmark has not been detected or tracked in the previous frame image, the switching unit 130 provides the current frame image to the landmark detection unit 150.

The landmark detection unit 150 detects a landmark in the current frame image. A color may be used as a landmark, but, in this exemplary embodiment of the invention, a pattern of a particular color aligned in a repeated and symmetric way is used. In addition, a CONDENSATION (CONditional DENSity propagATION) algorithm is used for landmark detection. The first detector 210 has a first degree of dispersion, for example, a probability distribution of 50, and the second detector 230 has a second degree of dispersion, for example, a probability distribution of 10. In other words, the first detector 210 has lower detection accuracy than the second detector 230 because it has a larger degree of dispersion than the second detector 230. The first detector 210 sets an entire frame of a color image as a sampling region, sets a degree of dispersion to a large value, and performs coarse detection, thereby estimating a rough position of a landmark. The second detector 230 sets a region around the rough position of the landmark as a sampling region, sets the degree of dispersion to a small value, and performs fine detection.

The landmark tracking unit 170 sets, as a sampling region, a region in the current frame image around a position of the landmark detected in the previous frame image received from the controlling unit 190 when the landmark has been detected or tracked in the previous frame image. Then, the landmark tacking unit 170 tracks a landmark in the sampling region. The CONDENSATION algorithm used for the landmark detection is also used for landmark tracking. The landmark tracking unit 170 performs similar functions as the second detector 230 of the landmark detection unit 150. When a landmark tracking is applied to frame images successive to a frame image in which the landmark has been detected, a high probability is assigned to a region where the landmark has been detected. Therefore, superior detection performance may be ensured even when the landmark is concealed or disappears temporarily.

The controlling unit 190 receives a detection or tracking result from the landmark detection unit 150 or the landmark tracking unit 170 and outputs a switching control signal to the switching unit 130 that provides the current frame image provided by the image input unit 110 to the landmark detection unit 150 or the landmark tracking unit 170 depending on a success of the landmark detection or the landmark tracking, i.e. in response to the switching control signal. Moreover, the controlling unit 190 transmits to the landmark tracking unit 170 a position coordinate value of a landmark detected or tracked when the landmark detection unit 150 or the landmark tracking unit 170 succeeds in the landmark detection or the landmark tracking.

As noted above, the switching unit 130, the landmark tracking unit 170, and the controlling unit 190 are optional. If these elements are not included, each frame image input to the image input unit 110 is provided to the landmark detection unit 150. Then, first landmark detection is performed using a weighted sampling method using the first degree of dispersion, and then second landmark detection is performed in the weighted sampling method using the second degree of dispersion.

Figure 3A:
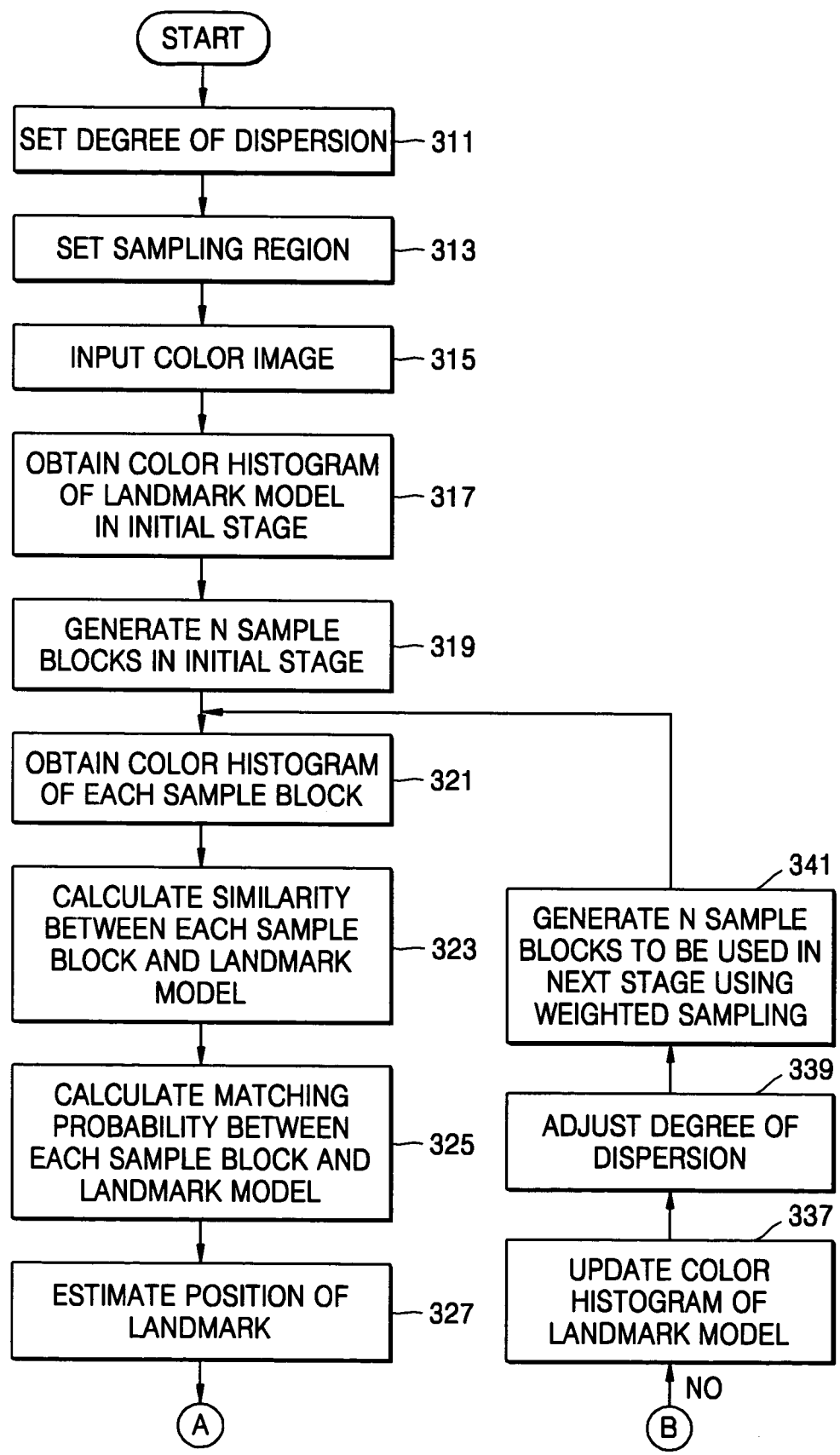
FIGS. 3A and 3B are flowcharts illustrating operations of a first detector and a second detector of the landmark detection unit illustrated in FIGS. 1 and 2.
Figure 3B:
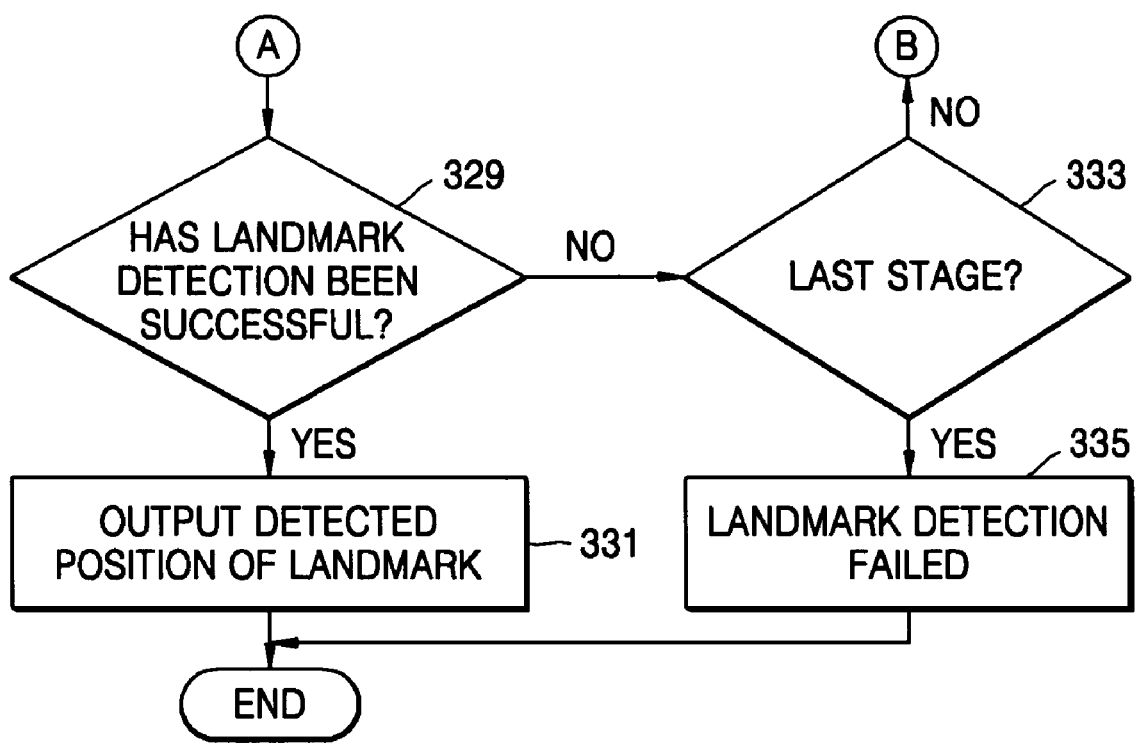

FIG. 3 is a flowchart illustrating operations of the first detector 210 and the second detector 230 of the landmark detection unit 150 of FIG. 2. The first and second detectors 210 and 230 have different degrees of dispersion, for example, 50 and 10, respectively, and different sampling regions. However, basic functions of the first and second detectors 210 and 230 are identical.

Referring to FIG. 3, a degree of dispersion is set to a predetermined value in operation 311. The degree of dispersion of the first detector 210 is set to a high value, and that of the second detector 230 is set to a low value, for example, a fifth of the degree of dispersion of the first detector 210.

In operation 313, a sampling region is set. For the first detector 210, an entire frame image is set as the sampling region, and for the second detector 230, a region around a rough position of a landmark estimated by the first detector 210 is set as the sampling region.

In operation 315, a color image of a current frame picked up by a camera is received. The color image is converted into chromaticity color space, thereby effectively and rapidly removing luminance components. Thus, the first and second detectors 210 and 230 can operate well in darkened conditions. A received RGB color image is converted into chromaticity color space using:

$$[r\ g] = \left[\frac{R}{R+G+B}\ \frac{G}{R+G+B}\right] \quad (1)$$

Figure 6:
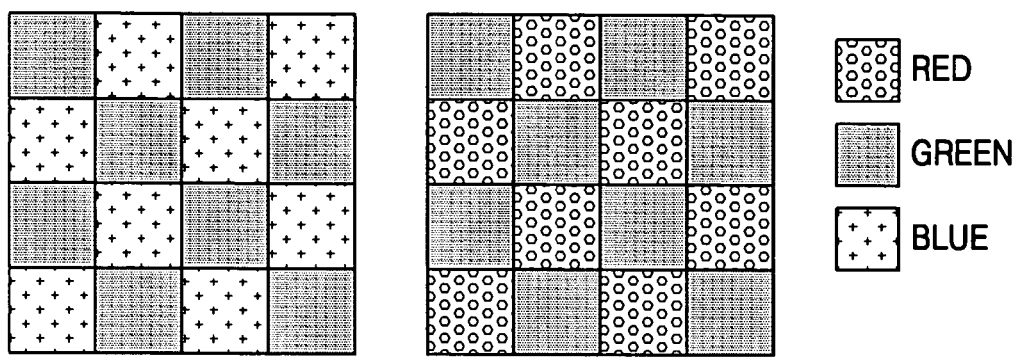
FIG. 6 illustrates an example of a landmark model used in the invention.

Meanwhile, a pattern of a color aligned in a repeated and symmetric way as illustrated in FIG. 6 may be used as a landmark according to an exemplary embodiment of the invention. The pattern, i.e., the landmark, can maintain its overall characteristics even when it is rotated, partly concealed, or appears to have different sizes due to distance. Such color alignment has a robust performance against geometrical and optical problems that may occur in an actual environment. The number of colors of which a landmark is composed may be two or four colors separated by large distances in chromaticity color space.

In operation 317, a color histogram of a landmark model in a normal state is obtained based on the CONDENSATION algorithm. The landmark model is pre-defined in an initial stage, i.e., a first frame image. In operation 319, based on the CONDENSATION algorithm, N sample blocks are generated in the initial stage, that is, the first frame image, and randomly distributed in the first frame image. Here, the number N of sample blocks is set to 50, and sizes of the sample blocks and landmark models may be set arbitrarily.

The feature amounts of all the sample blocks are obtained in operation 321. It is important to appropriately select the feature amounts of the landmark to detect and track the pre-defined landmark model in a stable manner. When information regarding a particular form or an edge of a landmark is used, the landmark detection may fail due to noise contained in an image or blurring of the image. Thus, in this exemplary embodiment of the invention, a color histogram, which is resistant to image distortion and can be extracted with a small amount of calculation, is used.

Figure 7:
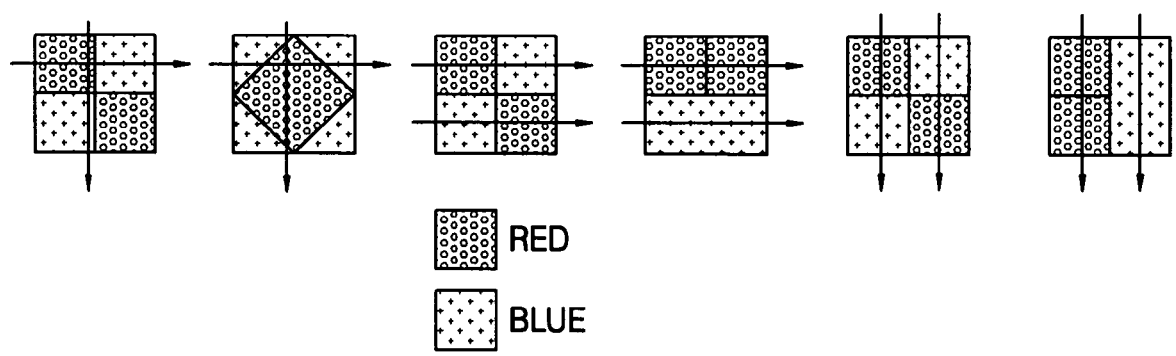
FIG. 7 illustrates a local color histogram.

The color histogram is divided into a global color histogram of a landmark or a local color histogram of a line or a row. The global color histogram may be used to measure an overall color similarity within a region since, although the landmark model has different patterns, it may exhibit similar global color histograms. The local color histogram defined along an image row or line as illustrated in FIG. 7 may also be used in parallel.

It is easy to calculate such a color histogram. In addition, even if the landmark model is rotated due to geometrical characteristics of its color pattern, or its size within the image changes, the characteristics of the global color histogram and the local histogram of the landmark remain unchanged. Further, since histogram characteristics can be extracted very quickly, histograms are suitable for real-time implementation. The histograms are also resistant to noise or image blurring since they are hardly affected by image processing. Therefore, intelligent systems, such as autonomous travelling robots, can detect and track a desired landmark model within a scene under any circumstances by comparing such feature amounts.

In operation 323, similarity between each sample block and the landmark model is measured. In this case, a histogram intersection indicating similarity among color histograms is used. When the histogram intersection is used, similarity (M (i, j)) between a sample block (i) and a landmark model (j) is defined as:

$$M(i,j) = GHI(i,j) + LHI(i,j), \quad (2)$$

where GHI and LHI denote a global histogram intersection and a local histogram intersection, respectively, and are defined as:

$$GHI(i,\ j) = \sum_r \sum_g [gh_i(r,\ g) \cap gh_{model\ j}(r,\ g)]; \text{ and} \quad (3)$$

$$LHI(i,\ j) = \sum_r \sum_g \sum_w lh_i(w,\ r,\ g) \cap lh_{model\ j}(w,\ r,\ g) + \quad (4)$$
$$\sum_r \sum_g \sum_h lh_i(h,\ r,\ g) \cap lh_{model\ j}(h,\ r,\ g),$$

where gh and lh indicate the global histogram and the local histogram, respectively, (r,g) indicates coordinates of each of the bins in a color histogram in chromaticity color space, and w and h indicate the numbers of lines and rows of the local histogram, respectively.

In operation 325, a matching probability (prob (i, j)) between the sample block (i) and the landmark model (j) is calculated using the similarity obtained from operation 323 using $$\text{prob}(i\ |\ j) = \frac{M(i,\ j)}{\sum_{k+1}^{N} M(k,\ j)}, \quad (5)$$

where N indicates the number of sample blocks.

In operation 327, a position of a landmark model in a current frame is estimated based on a weight center of N matching probabilities (prob (i,j)) calculated in operation 325.

In operation 329 (see FIG. 3B), it is determined whether the landmark detection is successful by comparing a color histogram of a landmark model at the position estimated in operation 327 with that of the pre-defined landmark model. In detail, if a difference between the two color histograms is equal to or less than a predetermined value, the landmark detection is determined to be successful, and thus a value of the landmark position detected in operation 331 is output. On the other hand, if the difference between the two color histograms is larger than the predetermined value, operation 333 is performed and it is determined whether the current frame is a last frame.

In operation 333, if the current frame is determined to be the last stage, i.e., a last frame, the landmark detection is determined to have failed in Operation 335. If the current frame is not the last frame, in operation 337, a color histogram $(C_j^{t+1})$ of a landmark model to be used in a $(t+1)^{th}$ frame is updated using a matching probability among the color histo grams of the sample blocks and using the sample blocks as follows:

$$C_j^{t+1} = (1-\alpha)C_j^t + \alpha \sum_{k+1}^{N} \text{prob}(k|j)C_k, \quad (6)$$

where α is a weighted value. If the weighted value is set to a large value, adaptability improves but performance deteriorates. $C_j^t$ denotes a color histogram of the landmark model (j) in a $t^{th}$ frame image, and $C_k$ denotes a color histogram of a $k^{th}$ sample block. By updating a color histogram of a landmark model, superior detection performance may be achieved even when luminance changes.

In operation 339, a degree of dispersion is adjusted, which will be described in more detail with reference to FIGS. 4 and 5. The operation of adjusting the degree of dispersion is optional. In operation 341, the degree of dispersion adjusted in operation 339 is applied to current frame, and N sample blocks to be used in a next frame are generated using weighted sampling based on the CONDENSATION algorithm. Then, operation 321 is performed.

Figure 4:
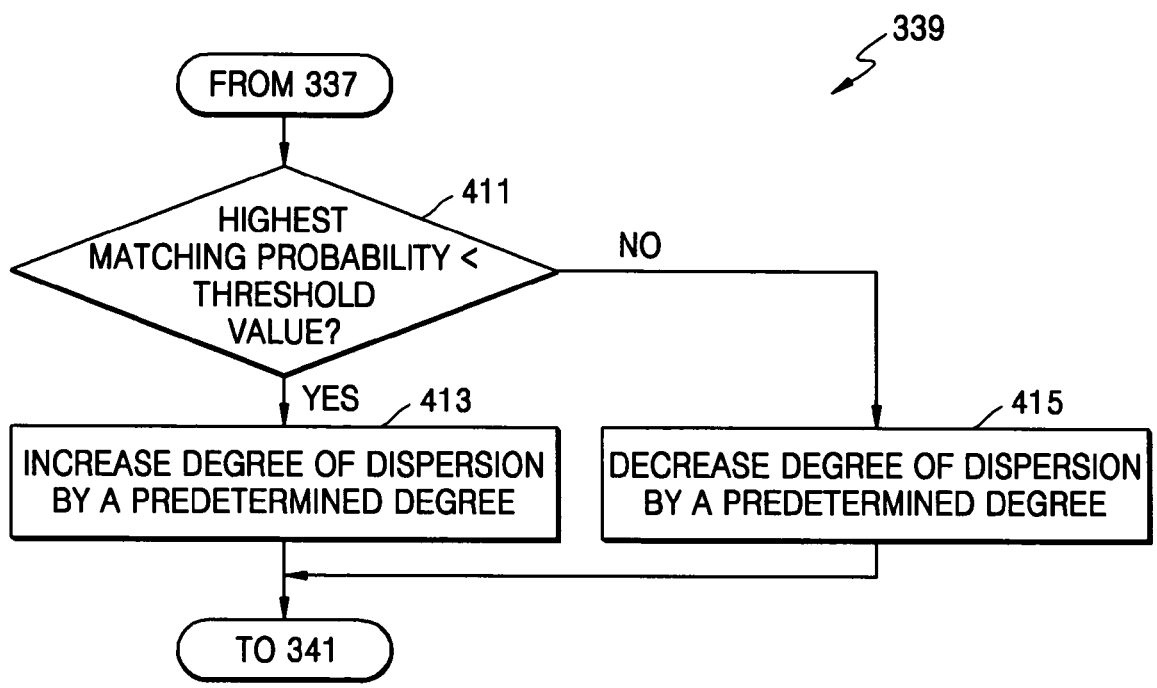
FIG. 4 is a flowchart illustrating an operation of adjusting a degree of dispersion in FIG. 3 according to another exemplary embodiment of the invention.

FIG. 4 is a flowchart illustrating the operation of adjusting the degree of dispersion (operation 339) according to an exemplary embodiment of the invention.

Referring to FIG. 4, a highest matching probability obtained from matching probabilities for each sample block (i) obtained in an $t^{th}$ frame and the landmark model (j) is compared with a predetermined threshold value in operation 411. The highest matching probability is an accumulative probability obtained by summing up all the matching probabilities for each sample block and the landmark model. If the highest matching probability is higher than the predetermined threshold value, the current frame and the landmark model match. If not, the current frame and the landmark model do not match.

In operation 413, if the highest matching probability is determined to be lower than the predetermined threshold value in Operation 411, a current degree of dispersion is increased by a predetermined degree, for example, 0.5. If the highest matching probability is determined to be equal to or greater than the threshold value in Operation 411, the current degree of dispersion is decreased by a predetermined degree, for example, 0.5. Then, the adjusted degree of dispersion is applied to an $(t+1)^{th}$ frame.

Figure 5:
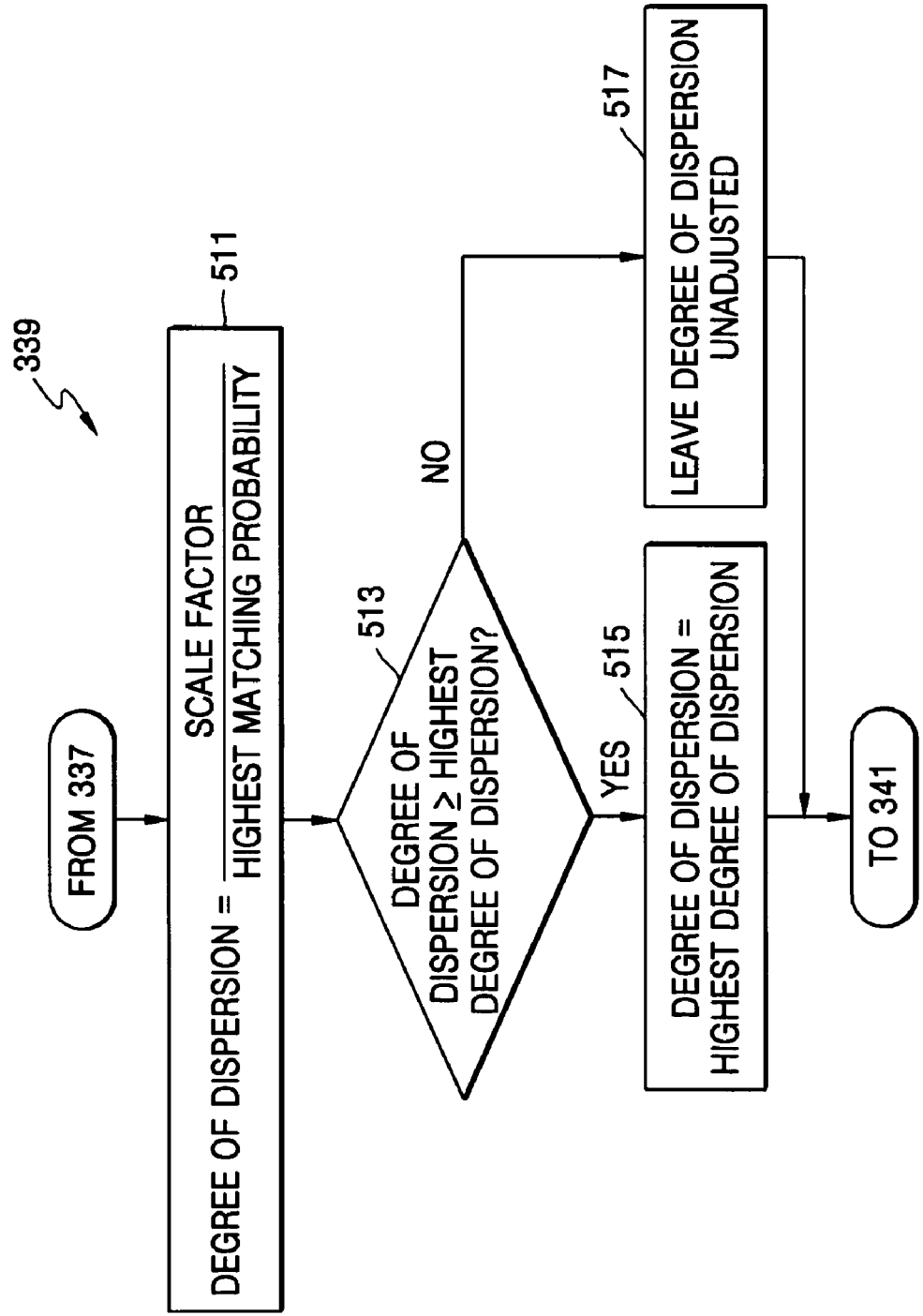
FIG. 5 is a flowchart illustrating the operation of adjusting the degree of dispersion in FIG. 3 according to yet another exemplary embodiment of the invention.

FIG. 5 is a flowchart illustrating the operation of adjusting the degree of dispersion in FIG. 3 according to another exemplary embodiment of the invention. While in the exemplary embodiment of FIG. 4, the degree of dispersion is adjusted in two stages according to the accumulative probability, in this exemplary embodiment, the degree of dispersion is gradually adjusted based on a functional relation. In other words, since a higher accumulative probability translates into a higher degree of matching accuracy, the degree of dispersion is lowered in inverse proportion to the accumulative probability using an appropriate function to track a landmark more accurately in a narrow region.

Referring to FIG. 5, in operation 511, an actual degree of dispersion is recalculated by dividing a predetermined scale factor by a highest matching probability.

In operation 513, the actual degree of dispersion is compared with a predetermined highest degree of dispersion. If the actual degree of dispersion is equal to or greater than the predetermined highest degree of dispersion, the highest degree of dispersion is set as a degree of dispersion to be applied to the $(t+1)^{th}$ frame image in operation 515. If the actual degree of dispersion is lower than the highest degree of dispersion, operation 341 is performed without adjusting the degree of dispersion in operation 517.

Examples of the weighted sampling based on the CONDENSATION algorithm according to an embodiment of the invention will now be described with reference to FIGS. 8A and 8B.

Figure 8A:
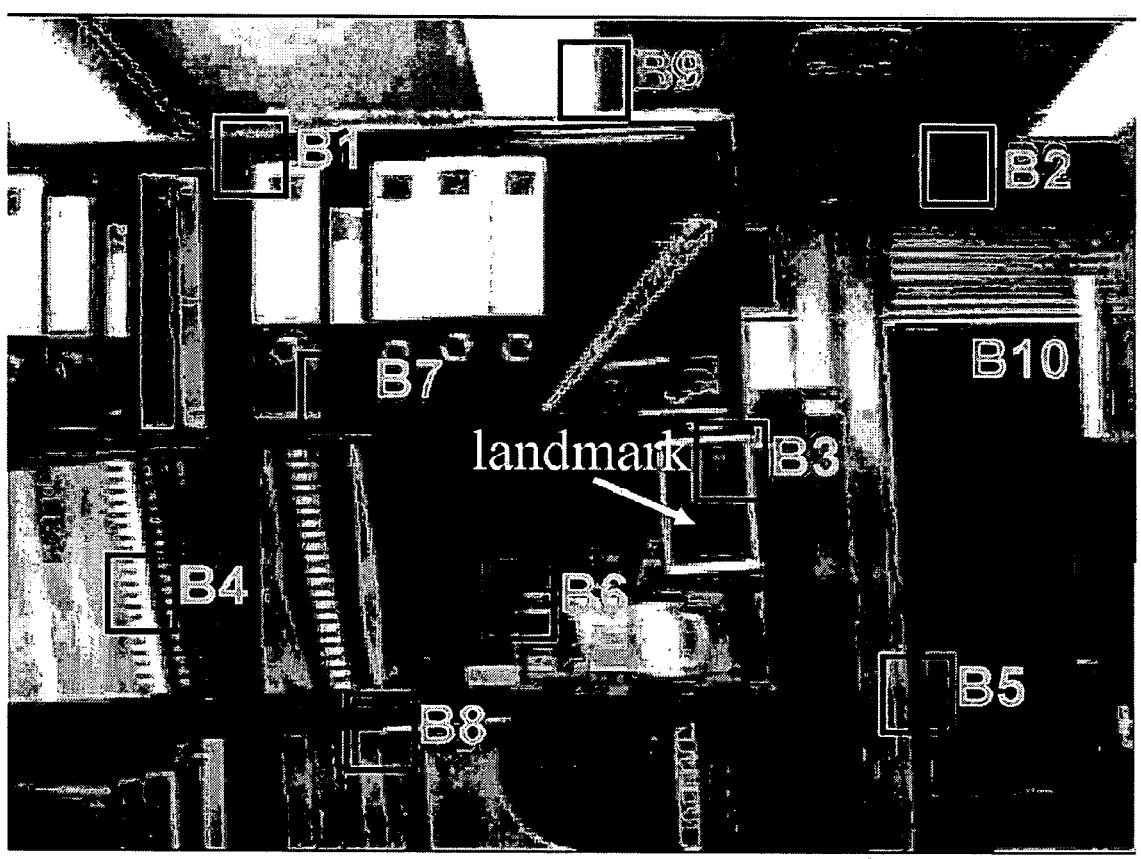
FIGS. 8A through 8B illustrate weighted sampling of a CONDENSATION algorithm according to the invention.

FIG. 8A illustrates sample blocks B1 through B10 distributed over an $i^{th}$ frame image. Matching probabilities for each of the sample blocks and a landmark is as follows.

TABLE 1

| Sample Block | Matching Probability |
|---|---|
| B1 | 0.11 |
| B2 | 0.03 |
| B3 | 0.21 |
| B4 | 0.09 |
| B5 | 0.13 |
| B6 | 0.15 |
| B7 | 0.08 |
| B8 | 0.11 |
| B9 | 0.04 |
| B10 | 0.05 |
| Total | 1.00 |

Figure 8B:
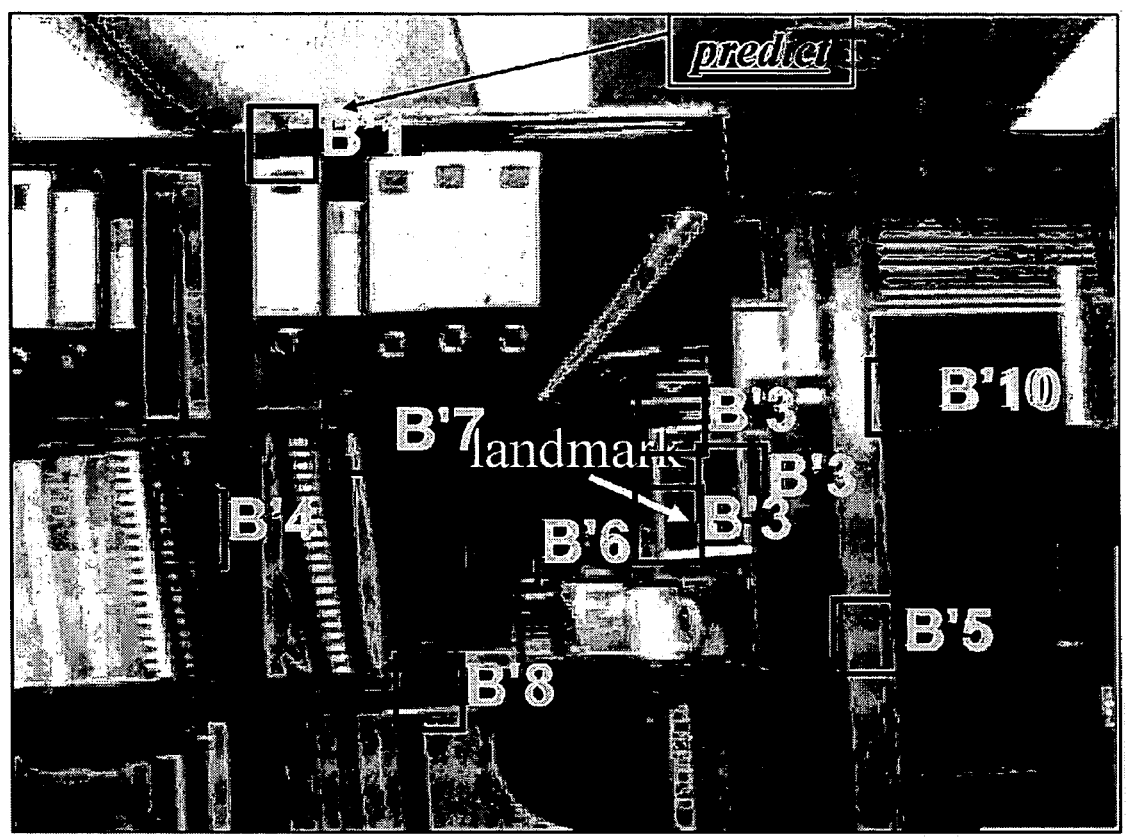

FIG. 8B illustrates sample blocks generated in the $(t+1)^{th}$ frame image by the weighted sampling according to the above matching probabilities.

TABLE 2

| Sample Block | Matching Probability | Next Frame |
|---|---|---|
| B1 | 0.11 | 1 |
| B2 | 0.03 | 0 |
| B3 | 0.21 | 3 |
| B4 | 0.09 | 1 |
| B5 | 0.13 | 1 |
| B6 | 0.15 | 1 |
| B7 | 0.08 | 1 |
| B8 | 0.11 | 1 |
| B9 | 0.04 | 0 |
| B10 | 0.05 | 1 |
| Total | 1.00 | 10 |

In other words, in $(t+1)^{th}$ frame image, three sample blocks B'3 are generated for a sample block B3 that had the highest matching probability in the ith frame image.

FIGS. 9A through 9D illustrate results of an experiment using the landmark detection method according to an exemplary embodiment of the invention. The experiment was conducted in an environment where luminance changes and many colored objects exist. In the drawings, white squares indicate sample blocks. In the experiment, 50 sample blocks were used.

Figure 9A:
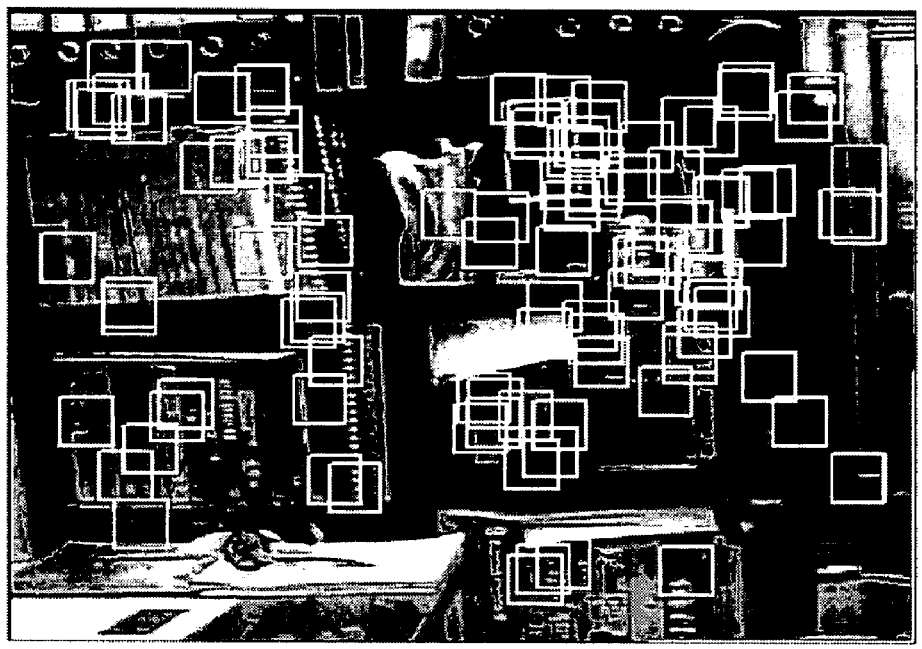
FIGS. 9A through 9D illustrate landmark detection processes using a landmark detection method according to the invention.
Figure 9B:
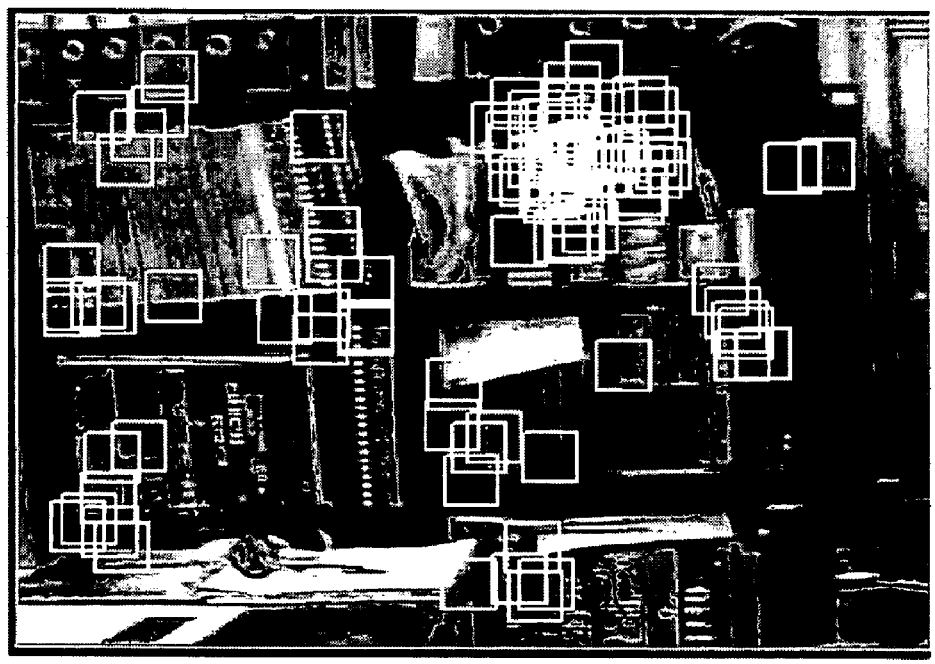
Figure 9C:
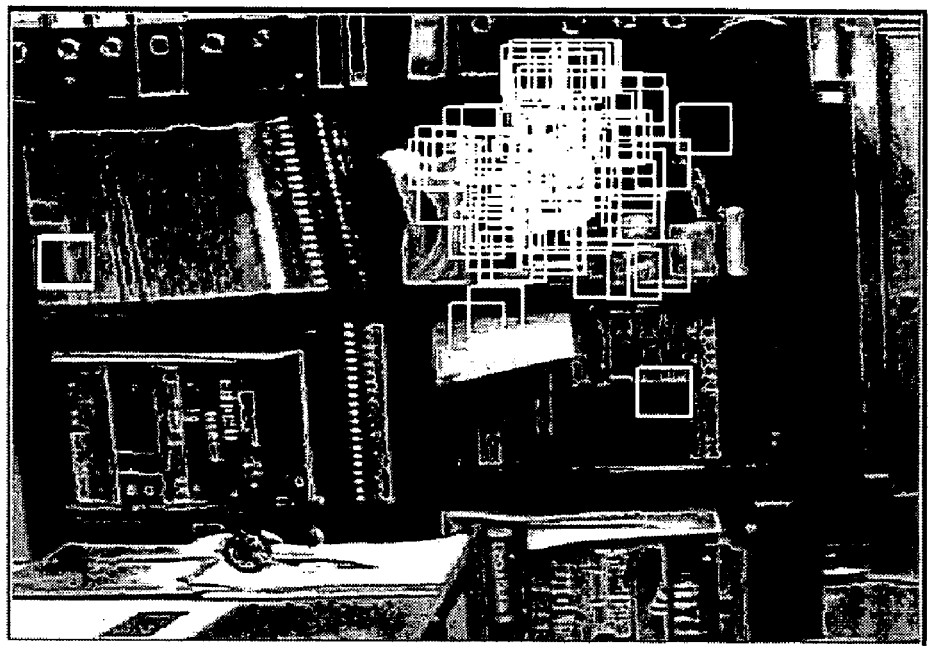
Figure 9D:

Referring to FIG. 9A, the sample blocks are widely scattered over an entire image, and each sample block has a probability value that reflects its similarity to a landmark model. Referring to FIGS. 9B and 9C, the sample blocks gradually converge on the landmark in response to the probability values for each subsequent frame. In fact, the sample blocks do not converge on the landmark. Rather, new sample blocks are created at a location adjacent to the landmark. FIG. 9D illustrates a result of the landmark detection, where a white small square indicates center coordinates of a landmark model.

The invention may be implemented as a computer-readable code on a computer-readable recording medium. The computer-readable recording medium may be any kind of recording device where data readable by a computer system is stored. The computer-readable recording medium may also be a ROM, a RAM, a CD-ROM, a magnetic tape, a floppy disk and an optical data storage device, and may also be implemented as a carrier wave (for example, Internet transmission). The computer-readable recording medium may be distributed over network-coupled computer systems so that the computer-readable code may be stored and executed in a distributed fashion. Functional programs, codes, and code segments required to implement the invention can be easily derived by programmers skilled in the art.

As described above, the invention not only reduces the time required for landmark detection but also enhances the accuracy of the landmark detection by setting an entire region of a frame image as a sampling region, setting a degree of dispersion to a high value, performing a first landmark detection, estimating a position of a landmark, setting a region around the estimated position of the landmark as a sampling region, setting the degree of dispersion to a low value, and, finally, performing a second landmark detection.

Moreover, the accuracy of the landmark detection can be improved by adaptively adjusting a degree of dispersion applied to each frame in the first and second landmark detections using a highest matching probability obtained from a current frame image.

Superior performance of landmark detection strongly resistant to luminance changes may be achieved by updating a feature, for example, a color histogram, of a landmark model using matching probabilities obtained from a current frame image, color histograms of sample blocks used in the current frame image, and a color histogram of the landmark model used in the current frame image.

Such a landmark detection method is applicable in various fields. For example, the landmark detection method may be used in an unmanned surveillance system for tracking humans, an intelligent transportation system for tracking vehicles, an intelligent vehicle system for tracking preceding vehicles to control the distance between vehicles, or when tracking a particular target for intelligent control.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A landmark detection apparatus for an intelligent system, the apparatus comprising:
   a first detection unit that generates a group of N first sample blocks in a first sampling region using a first weighted sampling method according to a first degree of dispersion, and that performs a first landmark detection by comparing a feature of each first sample block of the group of N first sample blocks to a feature of a landmark model, wherein the first sampling region is set to the entirety of a frame image; and
   a second detection unit that generates a group of N second sample blocks in a second sampling region using a second weighted sampling method according to a second degree of dispersion, and that performs a second landmark detection by comparing a feature of each second sample block of the group of N second sample blocks to the feature of the landmark model, wherein the second sampling region is set to an area less than the entirety of the frame image,
   wherein each of the first degree of dispersion and the second degree of dispersion is adaptively adjusted according to an accumulative probability in a current frame image, and then applied to a next frame image;
   and wherein the first detection unit and the second detection unit are implemented by a processor.

2. The apparatus of claim 1, wherein the first detection unit:
   calculates a matching probability between each first sample block of the group of N first sample blocks and the landmark model based on a comparison of a color histogram of each first sample block of the group of N first sample blocks and a color histogram of the landmark model;
   estimates a position of a detected landmark; and
   generates another group of N first sample blocks to be applied to a next frame image in a weighted sampling method according to the calculated matching probability.

3. The apparatus of claim 2, wherein the first detection unit updates the color histogram of the landmark model using: the color histograms of the first sample blocks of the group of N first sample blocks in the frame image; the calculated matching probabilities between each first sample block of the group of N first sample blocks and the landmark model, and a feature of the landmark model used in the frame image.

4. The apparatus of claim 1, wherein the second detection unit:
   calculates a matching probability between each second sample block of the group of N second sample blocks and the landmark model based on a comparison of a color histogram of each second sample block of the group of N second sample blocks and a color histogram of the landmark model;
   estimates a position of a detected landmark; and
   generates another group of N second sample blocks to be applied to a next frame image in a weighted sampling method according to the calculated matching probability.

5. The apparatus of claim 4, wherein the second detection unit updates the color histogram of the landmark model using: the color histograms of the second sample blocks of the group of N second sample blocks in the frame image; the calculated matching probabilities between each second sample block of the group of N second sample blocks and the landmark model; and a feature of the landmark model used in the frame image.

6. The apparatus of claim 1, wherein the first degree of dispersion is greater than the second degree of dispersion.

7. The apparatus of claim 1, wherein the second sampling region is set closely around a detected landmark detected in the first landmark detection.

8. A landmark detection method for an intelligent system performed on a processor, the method comprising using the processor to perform a process comprising:
   generating a group of N first sample blocks in a first sampling region using a first weighted sampling method according to a first degree of dispersion, and performing a first landmark detection by comparing a feature of each first sample block of the group of N first sample blocks to a feature of a landmark model, wherein the first sampling region is set to the entirety of a frame image; and
   generating a group of N second sample blocks in a second sampling region using a second weighted sampling method according to a second degree of dispersion, and performing a second landmark detection by comparing a feature of each second sample block of the group of second sample blocks to the feature of the landmark model, wherein the second sampling region is set to an area less than the entirety of the frame image, wherein each of the first degree of dispersion and the second degree of dispersion is adaptively adjusted according to an accumulative probability in a current frame image, and then applied to a next frame image.

9. The method of claim 8, wherein the first degree of dispersion is greater than the second degree of dispersion.

10. The method of claim 8, wherein the first degree of dispersion or the second degree of dispersion is increased or decreased according to a result of comparing the accumulative probability in the frame image with a predetermined threshold value, and applied to the next frame image.

11. The method of claim 8, wherein the first degree of dispersion or the second degree of dispersion is determined by a result of comparing an actual degree of dispersion in the frame image with a predetermined highest degree of dispersion, and applied to the next frame image.

12. The method of claim 8, wherein, after generating the group of N first sample blocks and the group of N second sample blocks, the feature of the landmark model is updated using: the features of the first sample blocks of the group of N first sample blocks and the second sample blocks of the group of N second sample blocks in the frame image; matching probabilities for the first sample blocks of the group of N first sample blocks and the second sample blocks of the group of N second sample blocks and the landmark model, and feature amounts of the landmark model used in the frame image.

13. The method of claim 8, wherein the feature is a color histogram.

14. The method of claim 8, further comprising:
generating color histograms of each first sample block of the group of N first sample blocks;
generating a color histogram of the landmark model;
calculating a similarity between the color histogram of each first sample block of the group of N first sample blocks and the color histogram of the landmark model; and
calculating a matching probability between each first sample block of the group of N first sample blocks and the landmark model based on the calculated similarity.

15. The method of claim 14, further comprising updating the color histogram of the landmark model using: the color histograms of the first sample blocks of the group of N first sample blocks in the frame image, the calculated matching probabilities between each first sample block of the group of N first sample blocks and the landmark model, and the feature of the landmark model used in the frame image.

16. The method of claim 14, further comprising adjusting the first degree of dispersion using the accumulative probability of the current frame image.

17. The method of claim 8, further comprising:
generating color histograms of each second sample block of the group of N second sample blocks;
generating a color histogram of the landmark model;
calculating a similarity between the color histogram of each second sample block of the group of N second sample blocks and the color histogram of the landmark model;
calculating a matching probability between each second sample block of the group of N second sample blocks and the landmark model based on the calculated similarity.

18. The method of claim 17, further comprising updating the color histogram of the landmark model using: the color histograms of the second sample blocks of the group of N second sample blocks in the frame image, the calculated matching probabilities between each first sample block of the group of N second sample blocks and the landmark model, and the feature of the landmark model used in the frame image.

19. The method according to claim 8, wherein the second sampling region is set closely around a detected landmark detected in the first landmark detection.

20. A tangible computer-readable recording medium for storing a program for performing a landmark detection method for an intelligent system, the method comprising:
generating a group of N first sample blocks in a first sampling region using a first weighted sampling method according to a first degree of dispersion, and performing a first landmark detection by comparing a feature of each first sample block of the group of N first sample blocks to a feature of a landmark model, wherein the first sampling region is set to the entirety of a current frame image; and
generating a group of N second sample blocks in a second sampling region using a second weighted sampling method according to a second degree of dispersion, and performing a second landmark detection by comparing a feature of each second sample block of the group of second sample blocks to the feature of the landmark model, wherein the second sampling region is set to an area less than the entirety of the current frame image,
wherein each of the first degree of dispersion and the second degree of dispersion is adaptively adjusted according to an accumulative probability in a current frame image, and then applied to a next frame image.

21. The computer-readable recording medium according to claim 20, wherein the second sampling region is set closely around a detected landmark detected in the first landmark detection.

* * * * *